United States Patent
Galindo et al.

(10) Patent No.: US 12,513,080 B2
(45) Date of Patent: *Dec. 30, 2025

(54) SOFTWARE DEFINED NETWORK ACCESS FOR ENDPOINT

(71) Applicant: Fortinet, Inc., Sunnyvale, CA (US)

(72) Inventors: Emilio Borbolla Galindo, Yucatán (MX); Juan Ernesto Lopez Silva, Adolfo Lopez Mateos Edo de México (MX)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,759

(22) Filed: Mar. 7, 2024

(65) Prior Publication Data

US 2025/0112856 A1    Apr. 3, 2025

Related U.S. Application Data

(63) Continuation of application No. 18/375,439, filed on Sep. 29, 2023, now Pat. No. 12,074,788.

(51) Int. Cl.
*H04L 45/12*   (2022.01)
*H04L 45/302*  (2022.01)

(52) U.S. Cl.
CPC .......... *H04L 45/306* (2013.01); *H04L 45/124* (2013.01)

(58) Field of Classification Search
CPC ... H04L 45/122; H04L 45/123; H04L 45/124; H04L 45/306
USPC ........................................................ 709/238
See application file for complete search history.

(56) References Cited

U.S. PATENT DOCUMENTS

| 11,770,309 B2 * | 9/2023 | Paruchuri ........... H04L 47/2475 |
| | | 370/236 |
| 2020/0195557 A1 * | 6/2020 | Duan ................... H04L 12/4645 |
| 2021/0194805 A1 * | 6/2021 | Li ........................... H04W 72/04 |
| 2022/0078103 A1 | 3/2022 | Prajapat |

FOREIGN PATENT DOCUMENTS

| CN | 107750441 | | 9/2022 | |
| WO | WO-2017163541 A1 * | | 9/2017 | ......... H04B 7/15507 |

* cited by examiner

*Primary Examiner* — Glenford J Madamba
(74) *Attorney, Agent, or Firm* — Law Office of Dorian Cartwright; Dorian Cartwright (57) ABSTRACT

Multiple types of lines are made simultaneously available, including a Wi-Fi link, a cell link and a wired link. A list of running cloud applications is identified by monitoring A quality of each available link for each running cloud application is periodically tested, including measurements of latency, jitter and packet loss. A first link is selected for a first application and a second link is selected for a second application. Data packets related to the first application are transmitted over a first link and data packets related to the second application over the second link.

19 Claims, 5 Drawing Sheets

SOFTWARE DEFINED NETWORK ACCESS FOR ENDPOINT

RELATED APPLICATIONS

This application is a continuation of U.S. application Ser. No. 18/375,439, filed on Sep. 29, 2023, which is incorporated herein by reference in its entirety.

FIELD OF THE INVENTION

The invention relates generally to computer networks, and more specifically, for selecting a best available link between multiple link types that are simultaneously available based on a cloud application running on the station.

BACKGROUND

Current technologies such as ZTNA and SASE are looking to provide more security to user devices so that they can be protected when accessing private applications, SaaS, and the internet.

The owners of these devices operate in a hybrid scheme. When they are located physically in their workplaces, they have the security provided by their organizations through devices such as firewalls, for example. They also have solutions that guarantee availability and reliability when accessing cloud applications and SaaS with appliances, such as SD-WAN.

But when users are working remotely, from their homes, airports, coffee shops, and other public Internet environments, security cannot be guaranteed with ZTNA or SASE.

As part of the growth and progressive embrace of technologies such as 5G and LTE, today we can commonly find devices which can incorporate, internal or through an USB port, a LTE/5G modem, and use it to access the cellular data network as an option for internet connection, besides the normal gateways of Wi-Fi or an ethernet port. However, even if said devices have or more alternatives to connect to the Internet, they do not work simultaneously, and heavily depend on the user, the configuration of the device and other things to determine which network to access.

What is needed is a robust technique for selecting a best available link between multiple link types that are simultaneously available based on a cloud application running on the station.

SUMMARY

To meet the above-described needs, methods, computer program products, and systems for selecting a best available link between multiple link types that are simultaneously available based on a cloud application running on the station.

In one embodiment, configuring available links, wherein the available links comprise making simultaneously available at least two of a Wi-Fi link, a cell link and a wired link. A list of running cloud applications is identified by monitoring a Transmission Control Protocol (TCP) connections using a destination IP and destination port to identify a specific cloud application from a database of cloud applications, wherein at least two application are running at the same time. A quality of each available link for each running cloud application is periodically tested. A quality is characterized by at least one of latency, jitter and packet loss.

In another embodiment, the best available link is selected. The best link is determined, on a per-application basis, by at least one of latency, jitter and packet loss. A first link is selected for a first application and a second link is selected for a second application. Data packets related to the first application are transmitted over a first link and data packets related to the second application over the second link.

Advantageously, computer networking is improved with more network traffic.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for selecting a best available link between multiple link types that are simultaneously available based on a cloud application running on the station. One of ordinary skill in the art will recognize many alternative embodiments that are not explicitly listed based on the following disclosure.

Figure 2:
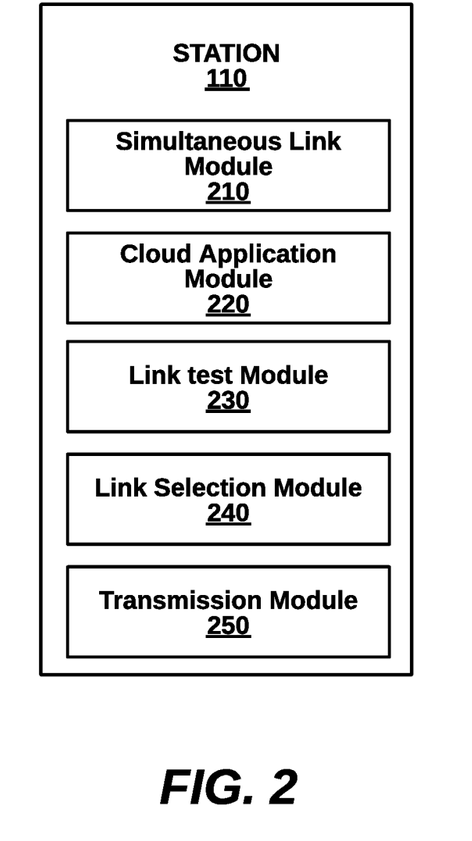
FIG. 2 is a more detailed block diagram illustrating a station of the system of FIG. 1, according to one embodiment.
Figure 3:
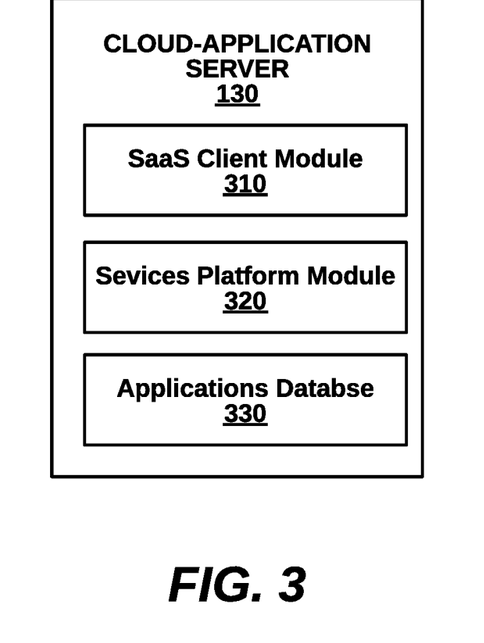
FIG. 3 is a block diagram illustrating a cloud-based application server of the system of FIG. 1, according to an embodiment.

I. Systems for Software Link Type Selection (FIGS. 1-3)

Figure 1:
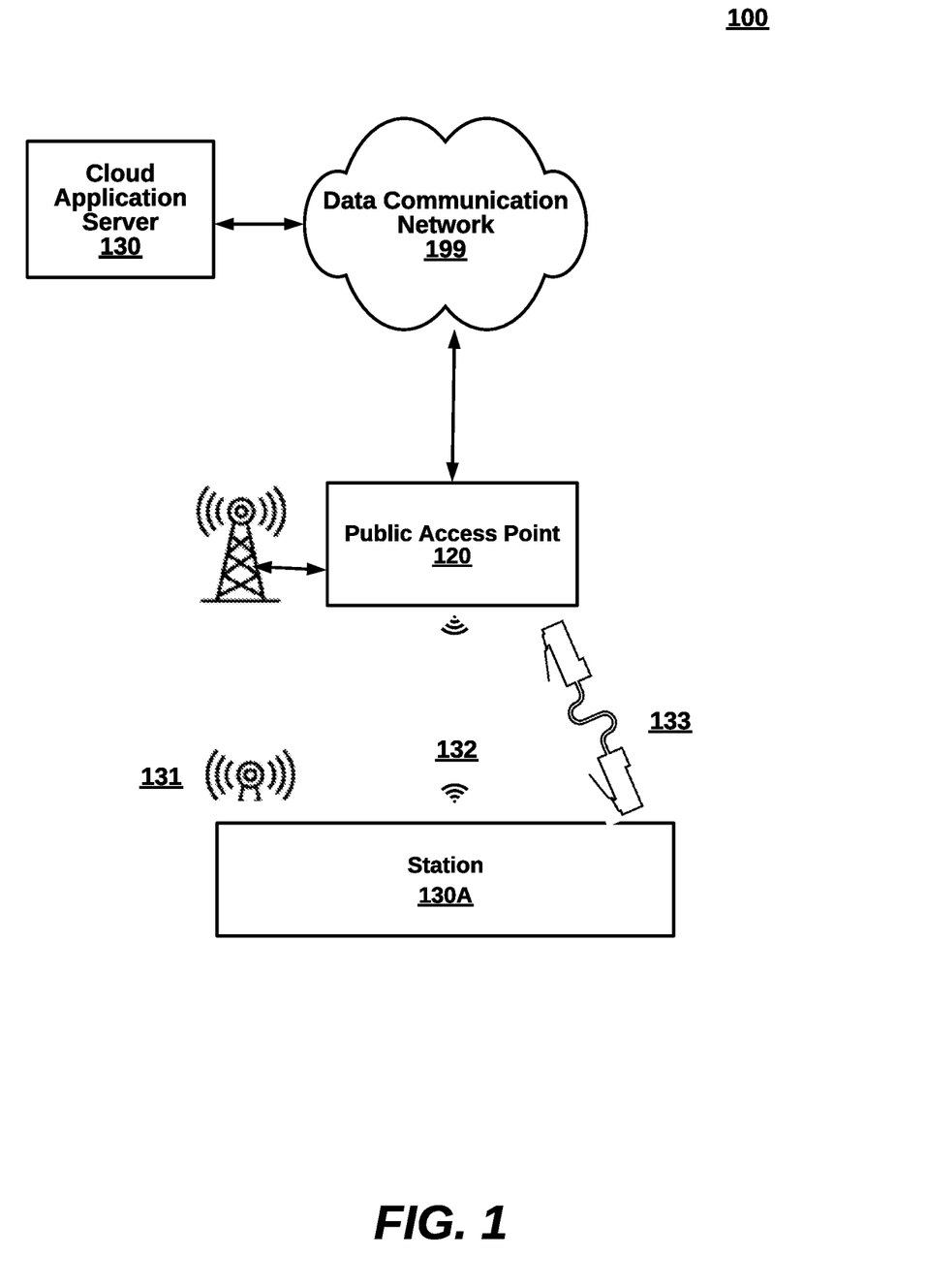
FIG. 1 is a high-level block diagram illustrating a system for selecting a best available link between multiple link types that are simultaneously available based on a cloud application running on the station, according to one embodiment.

FIG. 1 is a high-level block diagram illustrating a network system 100 for connecting to cloud-based applications over a public network, according to one embodiment. The network system 100 includes a station 110, a public access point 120 and a cloud application server 130. Other embodiments of the system 100 can include additional components that are not shown in FIG. 1, such as controllers, network gateways, routers, switches, additional access points and wired or wireless stations. Many variations are possible. The components are implemented in hardware, software, or a combination of both, as shown in the example below of FIG. 6.

The data communication network 199 can be composed of any data communication network such as an SDWAN, an SDN (Software Defined Network), WAN, a LAN, the Internet, WLAN, a cellular network (e.g., 3G, 4G, 5G or 6G), or a hybrid of different types of networks. The public access point 120 and the cloud application server 130 can be coupled to a data communication network 199 such as a private network connected to the Internet via a wired connection. The stations 110 can be connected to the data communication system 199 via wirelessly or wired connection. In FIG. 1, station 110 is wirelessly coupled to public access point 120. Various data protocols can dictate format for the data packets. For example, Wi-Fi data packets can be formatted according to IEEE 802.11, IEEE 802,11r, 802.11be, Wi-Fi 6, Wi-Fi 6E, Wi-Fi 7 and the like. Components can use IPv4 or IPv6 address spaces.

The station 110 selects an optimal link connection for each running application. Link type connections can be simultaneously available for a 5G or cell link 131, a Wi-Fi link 132, an Ethernet link 133 or other type. In one embodiment, each application is assigned a link type based on real-time conditions, and link type can be updated responsive to changing conditions. In another embodiment, a single application can utilize multiple link types. Link selection can be based on factors such as latency, jitter and/or packet loss. Cloud applications can have different SLA requirements and optimal bandwidths. As a result, a first application may be assigned to a 5G link while a second application is assigned to an Ethernet link.

The public access point 120 can be an open network that has no cost or a cost per time use. For example, an Internet café, a coffee shop, a hotel, or municipality can provide connections for customer devices to log on temporarily. The station 130 connects to the public access point 120 by using information received in beacons to generate and transmit a probe request. Once connected to the public setting, the quality controls of a private, enterprise network are likely minimal or not available to the station 130. The techniques described herein assist in bridging the gaps left when using public connections rather than enterprise connections.

The cloud-based application server 130 can host one or more applications available over the data communication network 199 through links of the station 130. A user can enter credentials or use SSO to see available applications. For example, Office 365 can have Office, Excel, Power Point and others. Adobe has similar application suites available online. Other applications are standalone, such as an online picture editor application. There can be a singer server or a complex data storage network hosting applications. Each application can have an associated SLA. In some cases of deeper integration, processes on the cloud-based application server 130 provide enhanced link performance data to the station 130, based on which application is chosen from the suite of applications. In other embodiments, all applications of a common suite are treated similarly with respect to link quality.

FIG. 2 is a more detailed block diagram illustrating the Wi-Fi controller 110 of FIG. 1, according to an embodiment. The Wi-Fi controller 110 includes a simultaneous link module 210, an AI model module 220, a threshold module 230, and a selection module 240. Components can be implemented in software and/or software. Many other variations of components are possible.

The simultaneous link module 210, in an embodiment, configures available links. The simultaneous available links include available at least two of a Wi-Fi link, a cell link and a wired link, depending on the type of device. The simultaneous link module 210 is an agent, daemon, patch or the like, in one embodiment, overwrites a routing table of the operating system. Initially, the routing table may have a default link such as Wi-Fi and different options available within Wi-Fi, such as 6 GHz, 5 GHz or 2.4 GHz. If Ethernet is the default, different Ethernet ports may be available within. One link type may be a failover for a different type, such as when a VoIP telephone call having low quality is switched to 5G. According to the present techniques, the routing table is overwritten by an agent to include multiple links at the same time, such as Wi-Fi and 5G. This allows applications to be routed over different types of links or to be combined over different types of links.

The cloud application module 220 identifies a list of running cloud applications by monitoring a TCP connections using a destination IP and destination port to identify a specific cloud application from a database of cloud applications. The identification can be specific (e.g., Facebook, YouTube or Salesforce) or categorical (e.g., social media, cloud IT, storage, backup). At least two application are running at the same time, and can be assigned different link types. Additionally, one application can be assigned to more than one link type.

The link test module 230 can periodically test a quality of each available link, for each running cloud application. Quality is characterized by at least one of latency, jitter and packet loss, among other factors. In some embodiments, a link health monitor can track the performance SLA from each link available.

The link selection module 240 selects the best available link, wherein the best link is determined, on a per-application basis, by at least one of latency, jitter and packet loss. The first link is selected for a first application and a second link is selected for a second application. Other selection criteria can be manual, best quality, lowest cost or maximum bandwidth.

The transmission module 250 can simultaneously send data packets related to the first application over a first link and data packets related to the second application over the second link. The transmission module 250 can represent different hardware and software systems, such as USB dongle for 5G plug in, an on board Wi-Fi transceiver, a Bluetooth transceiver or an Ethernet port, without limitation.

FIG. 3 is a more detailed block diagram illustrating the cloud-based application server 120 of FIG. 1, according to an embodiment. The cloud-based application server 120 includes a Software as a Service (SasS) client interface module 210 interacts with clients, customer accounts, and connectivity. In one case, enhanced link data is provided for connections, such as link jitter observed from the destination. A services platform module 320 provides a client interface to run applications from the applications database 330. A selected app can be loaded up and run on a user interface. Many other variations of components are possible.

II. Methods for Software Link Type Selection (FIGS. 4-5)

Figure 4:
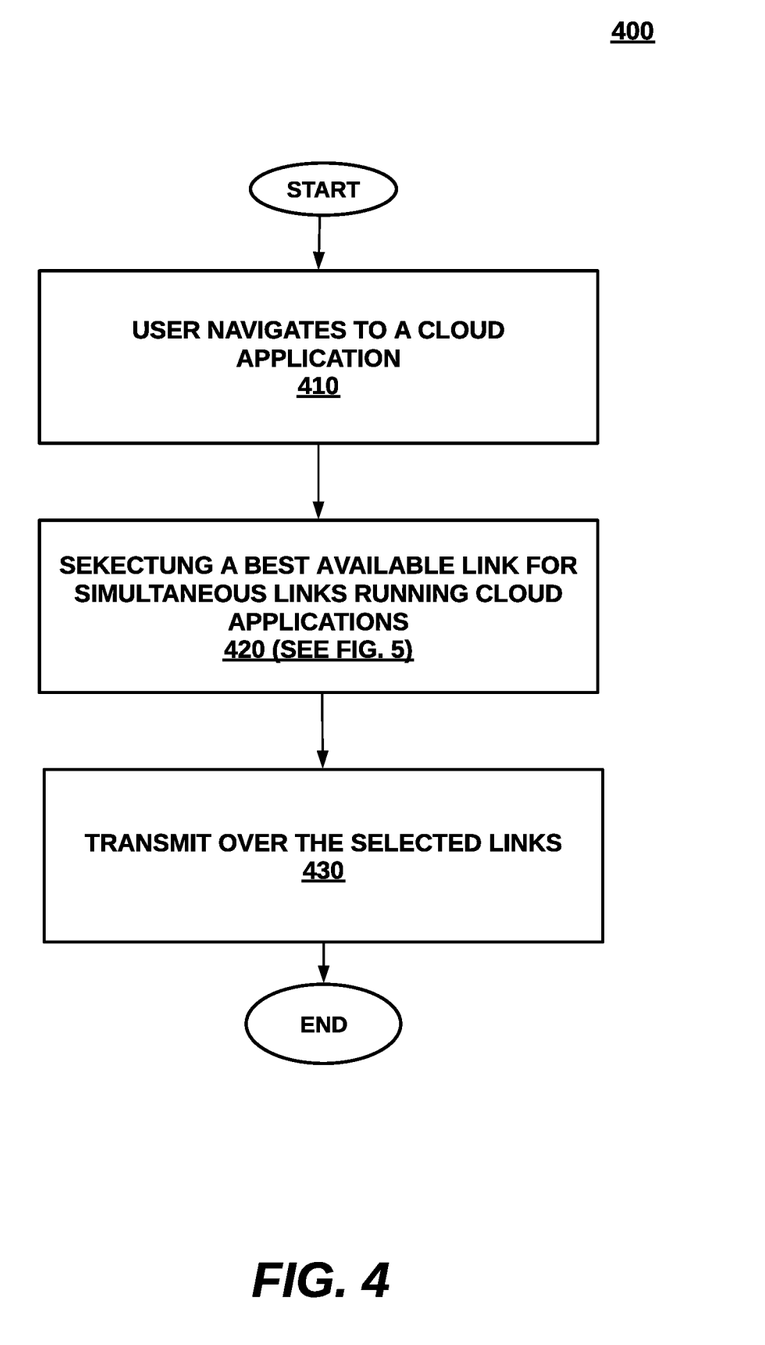
FIG. 4 is a high-level flow chart for connecting to cloud-based applications over a public network, according to an embodiment.

FIG. 4 is a high-level flow diagram illustrating a method 400 for connecting to cloud-based applications over a public network, according to an embodiment. The method 400 can be implemented by, for example, system 100 of FIG. 1. The steps can be performed in a different order and each step is a general grouping of functions that can be regrouped, along with other variations.

At step 410, a user navigates to a cloud application server. At step 420, selecting a best available link between multiple link types that are simultaneously available based on a cloud application running on the station. At step 430, the stations transmit over the selected link.

Figure 5:
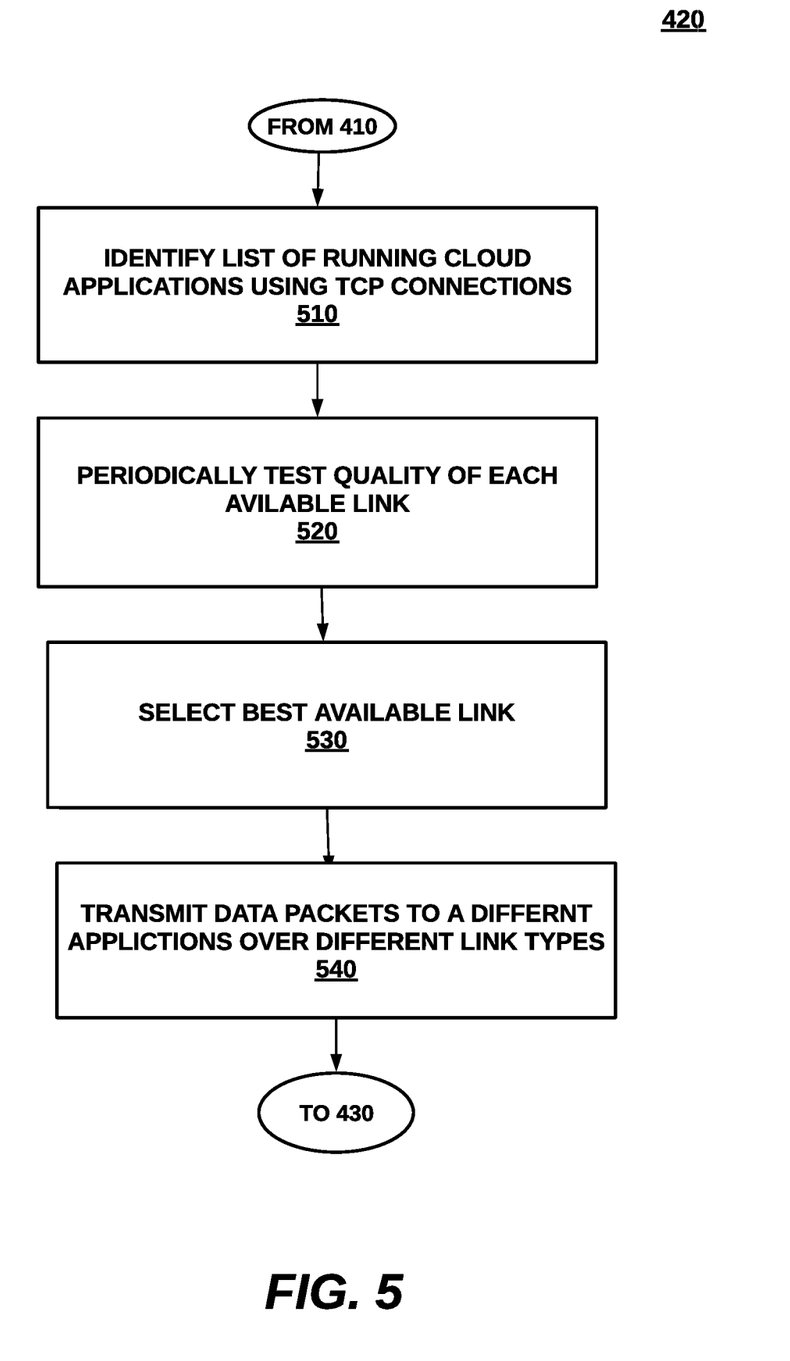
FIG. 5 is a more detailed flow chart for a step of selecting a best available link between multiple link types that are simultaneously available based on a cloud application running on the station, from the method of FIG. 4, according to one embodiment.

A more detailed example of step 420 for selecting a best available link between multiple link types that are simultaneously available based on a cloud application running on the station, is shown in FIG. 5, according to one embodiment. At step 510, configuring available links, wherein the available links comprise making simultaneously available at least two of a Wi-Fi link, a cell link and a wired link.

At step 510, a list of running cloud applications is identified by monitoring TCP connections using a destination IP and destination port to identify a specific cloud application from a database of cloud applications, wherein at least two application are running at the same time.

At step 520, a quality of each available link is periodically tested, for each running cloud application. Quality is characterized by at least one of latency, jitter and packet loss.

At step 530, the best available link is selected. The best link is determined, on a per-application basis, by at least one of latency, jitter and packet loss. A first link is selected for a first application and a second link is selected for a second application; and At step 540, data packets related to the first application are transmitted over a first link and data packets related to the second application over the second link.

III. Computing Device for Software Link Type Selection (FIG. 6)

Figure 6:
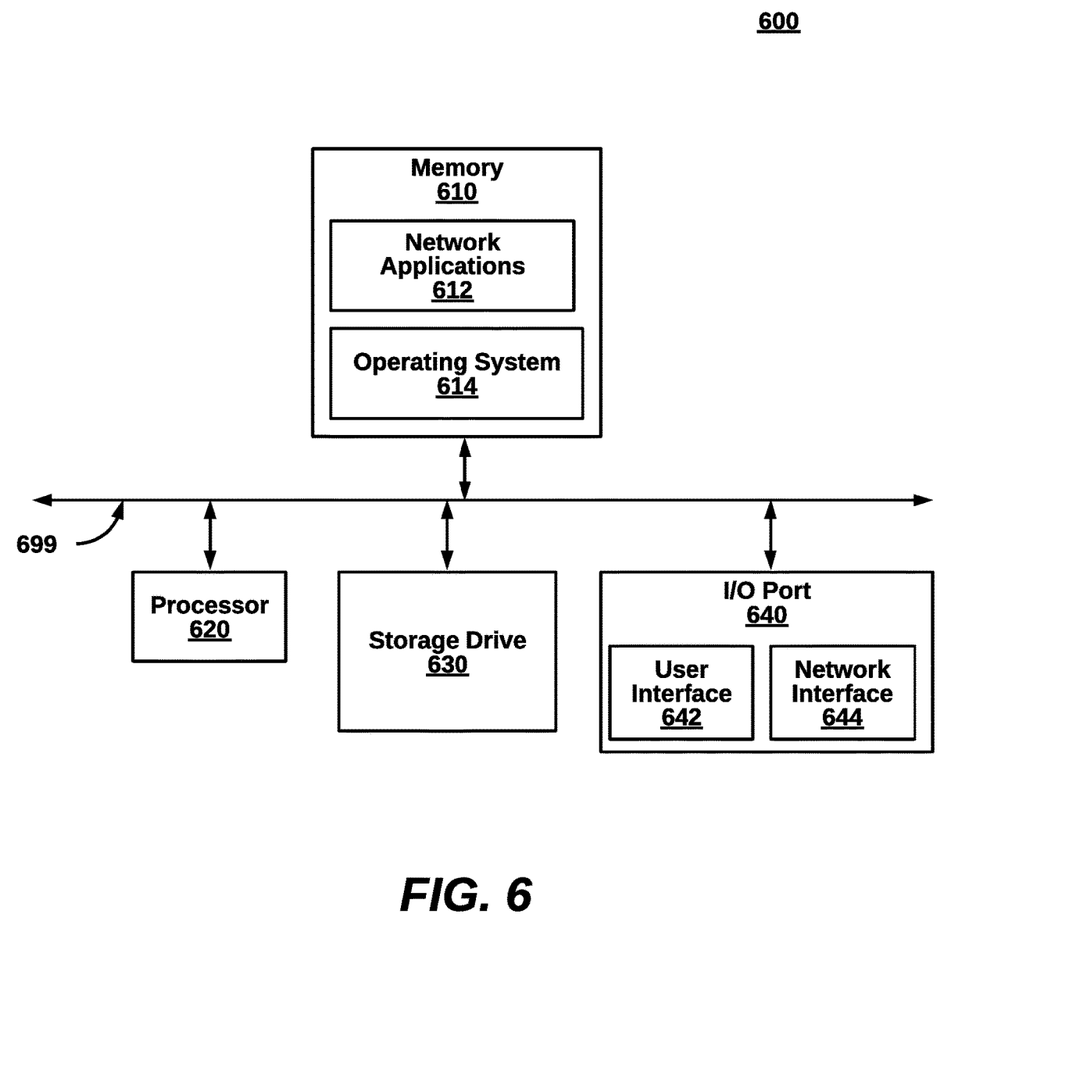
FIG. 6 is a block diagram illustrating an example computing device implementing the network system of FIG. 1, according to one embodiment.

FIG. 6 is a block diagram illustrating a computing device 600 implementing the packet processor 100 of FIG. 1, according to one embodiment. The computing device 600 is a non-limiting example device for implementing each of the components of the system 100, including the station 110, the public access point 120 and the cloud-based application server 130. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP ×84 Edition, Windows Vista, Windows CE, Windows Mobile, OR Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a Wi-Fi network device for selecting a best available link between multiple link types that are simultaneously available based on a cloud application running on the station, the method comprising the steps:
    configuring available links, wherein the available links comprise making simultaneously available at least two of a Wi-Fi link, a cell link and a wired link, detecting available links and overwriting a routing table of an operating system that defaults to the first link and the second links being in a serial-type failover relationship to a parallel-type simultaneously available relationship;
    identifying a list of running cloud applications by monitoring a Transmission Control Protocol (TCP) connections using a destination IP and destination port to identify a specific cloud application from a database of cloud applications, wherein at least two application are running at the same time;
    periodically testing a quality of each available link, for each running cloud application;
    selecting the best available link, wherein the best link is determined, on a per-application basis, wherein a first link is selected for a first application and a second link is selected for a second application; and
    transmitting data packets related to the first application over a first link and data packets related to the second application over the second link.

2. The method of claim 1, wherein the transmitting data packets step comprises transmitting data packets related to the first application over a first link and a second link, simultaneously, and also transmitting the second application over the second link.

3. The method of claim 1, wherein the step of identifying the list of running cloud applications comprises receiving data from a netstat process from an operating system.

4. The method of claim 1, wherein the step of identifying the list of running cloud applications comprises looking up at least one of the running applications on an ISDB server by IP address and port number.

5. The method of claim 1, wherein the step of selecting the best available link comprises determining a service level agreement (SLA) associated with the first application and the second application against the quality testing of the first link and the second link.

6. The method of claim 1, wherein the Wi-Fi network device is a Wi-Fi controller.

7. The method of claim 1, wherein the Wi-Fi network device is an access point.

8. The method of claim 1 wherein the wired link comprises one or more Ethernet links.

9. The method of claim 1, wherein the Wi-Fi link comprises one or more IEEE 802.11 links.

10. The method of claim 1, wherein the cell link comprises one or more 5G cell links.

11. A non-transitory computer-readable medium storing computer-readable instructions in a station for selecting a best available link between multiple link types that are simultaneously available based on a cloud application running on the station, the method comprising:
    configuring available links, wherein the available links comprise making simultaneously available at least two of a Wi-Fi link, a cell link and a wired link, detecting available links and overwriting a routing table of an operating system that defaults to the first link and the second links being in a serial-type failover relationship to a parallel-type simultaneously available relationship;
    identifying a list of running cloud applications by monitoring a Transmission Control Protocol (TCP) connections using a destination IP and destination port to identify a specific cloud application from a database of cloud applications, wherein at least two application are running at the same time;
    periodically testing a quality of each available link, for each running cloud application;
    selecting the best available link, wherein the best link is determined, on a per-application basis, wherein a first link is selected for a first application and a second link is selected for a second application; and
    transmitting data packets related to the first application over a first link and data packets related to the second application over the second link.

12. A station to select a best available link between multiple link types that are simultaneously available based on a cloud application running on the station, the Wi-Fi network device comprising:
    a processor;
    a network communication module, communicatively coupled to the processor and to the data communication network; and
    a memory, communicatively coupled to the processor and storing:
        a simultaneous link module to configure available links, wherein the available links comprise making simultaneously available at least two of a Wi-Fi link, a cell link and a wired link, detecting available links and overwriting a routing table of an operating system that defaults to the first link and the second links being in a serial-type failover relationship to a parallel-type simultaneously available relationship;
        a cloud application module to identify a list of running cloud applications by monitoring a Transmission Control Protocol (TCP) connections using a destination IP and destination port to identify a specific cloud application from a database of cloud applications, wherein at least two application are running at the same time;

a link test module to periodically test a quality of each available link, for each running cloud application;

a link selection module to select the best available link, wherein the best link is determined, on a per-application basis, wherein a first link is selected for a first application and a second link is selected for a second application; and a transmission module to transmit data packets related to the first application over a first link and data packets related to the second application over the second link.

13. The method of claim 12, wherein the step of configuring available links comprises: detecting available links; and overwriting a routing table of an operating system that defaults to the first link and the second links being in a serial-type failover relationship to a parallel-type simultaneously available relationship.

14. The method of claim 12, wherein the transmitting data packets step comprises transmitting data packets related to the first application over a first link and a second link, simultaneously, and also transmitting the second application over the second link.

15. The method of claim 12, wherein the step of identifying the list of running cloud applications comprises receiving data from a netstat process from an operating system.

16. The method of claim 12, wherein the step of identifying the list of running cloud applications comprises looking up at least one of the running applications on an ISDB server by IP address and port number.

17. The method of claim 12, wherein the step of selecting the best available link comprises determining a service level agreement (SLA) associated with the first application and the second application against the quality testing of the first link and the second link.

18. The method of claim 1, wherein the Wi-Fi network device is a Wi-Fi controller.

19. The method of claim 1, wherein the Wi-Fi network device is an access point.

* * * * *